United States Patent [19]
Brotzman, Jr. et al.

[11] Patent Number: 6,033,781
[45] Date of Patent: Mar. 7, 2000

[54] CERAMIC POWDERS COATED WITH SILOXANE STAR-GRAFT POLYMERS

[75] Inventors: Richard W. Brotzman, Jr., Naperville; John H. Aikens, LaGrange Park, both of Ill.

[73] Assignee: Nanophase Technologies Corporation, Burr Ridge, Ill.

[21] Appl. No.: 08/827,229

[22] Filed: Mar. 28, 1997

Related U.S. Application Data

[60] Provisional application No. 60/014,838, Apr. 4, 1996.

[51] Int. Cl.⁷ ..................................................... B32B 18/00
[52] U.S. Cl. ........................ 428/405; 106/490; 252/363.5; 427/213.36; 427/221; 428/407; 528/32; 528/40; 528/43
[58] Field of Search ............................... 252/315.2, 363.5; 427/221, 213.36; 428/405, 407; 528/32, 40, 43; 516/100; 106/490

[56] References Cited

U.S. PATENT DOCUMENTS

| | | | |
|---|---|---|---|
| 2,885,366 | 5/1959 | Iler | 252/313.2 |
| 2,938,009 | 5/1960 | Lucas | 523/212 |
| 3,437,502 | 4/1969 | Werner | 106/437 |
| 3,635,743 | 1/1972 | Smith | 106/490 |
| 3,671,484 | 6/1972 | Cooper et al. | 524/300 |
| 3,816,152 | 6/1974 | Yates | 106/287.12 |
| 3,849,152 | 11/1974 | Mimeault | 428/407 X |
| 3,905,936 | 9/1975 | Hawthorne | 427/221 X |
| 4,151,154 | 4/1979 | Berger | 428/405 X |
| 4,243,692 | 1/1981 | Scholze et al. | 427/2.13 |
| 4,271,234 | 6/1981 | Schönafinger et al. | 428/405 |
| 4,574,082 | 3/1986 | Tietjen et al. | 424/63 |
| 4,644,077 | 2/1987 | Gupta | 556/457 |
| 4,818,614 | 4/1989 | Fukui et al. | 428/403 |
| 4,877,604 | 10/1989 | Schlossman | 424/64 |
| 4,882,225 | 11/1989 | Fukui et al. | 428/405 |
| 4,927,464 | 5/1990 | Cowie | 106/436 |
| 5,035,803 | 7/1991 | Cohen | 428/405 X |
| 5,063,254 | 11/1991 | Nakos | 528/32 X |
| 5,068,056 | 11/1991 | Robb | 252/313.1 |
| 5,070,175 | 12/1991 | Tsumura et al. | 528/12 |
| 5,143,722 | 9/1992 | Hollenberg et al. | 424/63 |
| 5,274,064 | 12/1993 | Sarkar | 528/32 X |
| 5,310,578 | 5/1994 | Thurn-Muller et al. | 427/220 |
| 5,328,683 | 7/1994 | Harashima et al. | 424/63 |
| 5,348,760 | 9/1994 | Parker et al. | 427/9 |
| 5,411,761 | 5/1995 | Inokuchi et al. | 427/220 |
| 5,440,001 | 8/1995 | Griswold et al. | 528/40 X |
| 5,674,624 | 10/1997 | Miyazaki et al. | 252/315.2 X |

FOREIGN PATENT DOCUMENTS

| | | |
|---|---|---|
| 0 389 138 A2 | 3/1989 | European Pat. Off. . |
| 0 665 004 A2 | 1/1994 | European Pat. Off. . |
| 2217987 | 11/1989 | United Kingdom . |
| WO 90/06103 | 6/1990 | WIPO . |
| WO 90/09777 | 9/1990 | WIPO . |

OTHER PUBLICATIONS

*Sol–Gel Science,* Academic Press, Chapter 3 and 4, Brinker et al., 1990.

*Primary Examiner*—Richard D. Lovering
*Attorney, Agent, or Firm*—McAndrews, Held & Malloy, Ltd.

[57] ABSTRACT

A coated ceramic powder comprises a plurality of ceramic particles and a siloxane star-graft coating polymer encapsulating at least a portion of the particles. The coating polymer comprises $Si(w,x,y,z)$, where w, x, y and z are the mole percent tetrafunctional, trifunctional, difunctional and monofunctional monomeric units, respectively, and wherein w is about 20–100 and x, y and z are about 0–30, 0–50 and 0–10, respectively, and at least one of x, y and z is greater than zero. A method of preparing a coated ceramic powder comprises the steps of (a) polymerizing a tetrafunctional siloxane monomer and at least one of a trifunctional siloxane monomer, a difunctional siloxane monomer and a monofunctional siloxane monomer, (b) adding a quantity of ceramic powder to a reaction vessel, (c) shear mixing the ceramic powder for a time sufficient to wet substantially all of the powder surface, (d) adding the siloxane polymer prepared in step (a) to the reaction vessel containing the shear mixed ceramic powder, (e) shear mixing the shear mixed ceramic powder and the siloxane polymer for a time sufficient to form a siloxane polymer coated ceramic powder, and (f) separating the coated ceramic powder from the components remaining in the reaction vessel.

1 Claim, 1 Drawing Sheet

CERAMIC POWDERS COATED WITH SILOXANE STAR-GRAFT POLYMERS

CROSS-REFERENCE TO RELATED APPLICATION

This application is related to and claims priority benefits from U.S. patent application Ser. No. 60/014,838 filed Apr. 4, 1996, entitled "Ceramic Powder Coatings", which is incorporated herein by reference in its entirety.

FIELD OF THE INVENTION

This invention relates generally to ceramic powder coatings. More particularly, this invention relates to siloxane star-graft polymers for coating ceramic powders, thereby enabling the dispersion of such powders in oils, polymers and water.

BACKGROUND OF THE INVENTION

Ceramic powders are inorganic compositions that are naturally hydrophilic and require a coating to impart one or more of the following characteristics:

(1) A coating is required to enable the surface to be wetted by, or compatible with, organic materials such as solvents. Surface wetting is required to prepare an intimate ceramic powder/organic dispersion.

(2) A coating is required to passivate the surface of the ceramic powder.

(3) A coating is required to render anatase titania ($TiO_2$) non-photoactive.

(4) A coating is required where specific functionalities are required on the ceramic powder surface, such as epoxy groups, carboxyl groups, and the like.

(5) A coating is required to form dispersed-phase, aqueous ionic-gels that do not phase separate.

As used herein, the term "ceramic" refers to metal oxides, including but not limited to titanium dioxide ($TiO_2$; sometimes referred to as "titania"), alumina ($Al_2O_3$), zinc oxide (ZnO), and iron oxides including $\gamma$-$Fe_2O_3$ (brown in color), $\alpha$-$Fe_2O_3$ (red in color) and ferrous oxide ($Fe_3O_4$; black in color; sometimes referred to as "magnetite"), and nonmetal oxides, including but not limited to silicon dioxide ($SiO_2$; sometimes referred to as "silica").

Inorganic surfaces have been conventionally modified by absorption, ion exchange, and covalent bonding. Surface modification by absorption and ion exchange require the surface to have appropriate chemical characteristics. Reactions that enable covalent bonding to inorganic surfaces generally involve reactions on hydroxylic surfaces.

Inorganic surfaces may also be coated by graft polymerization and encapsulation. Inorganic powders may be coated by the precipitation of powders in the presence of suspended powders or by spray drying of polymer solutions containing the powder. However, these conventional methods yield uneven coatings and the formation of coated agglomerates. Graft polymerization initiated by adsorbed species, or involving their copolymerization, favors uniform polymeric coatings.

The present siloxane star-graft polymer coatings are derived from the acid-catalyzed silicate sols discussed in *Sol-Gel Science*, C. J. Brinker and G. W. Scherer, Academic Press, 1990, Chapters 3 and 4. Such acid-catalyzed silicate sols are fractal, silicon-based polymers, the structure of which is shown, in two-dimensions, in FIG. 1. The present siloxane star-graft polymers employ this polymer morphology, in three dimensions, as a starting point, bonding to the fractal backbone specific moieties, thereby forming a fractal, star-graft copolymer using molecularly engineered inorganic surface/diluent interactions. Inherent in the present method of preparing such siloxane star-graft polymers is the control of the fractal nature of the backbone by allowing only desired branching probabilities to occur. Such control is realized by selection of monomers with the desired functionality and reactivity.

Silicon-based polymers will be referred to herein using the following nomenclature:

$$Si(w,x,y,z),$$

where w, x, y and z refer to the mole percent tetrafunctional, trifunctional, difunctional and monofunctional monomers, respectively, that are employed in synthesizing the sol. The ratio of total moles water to total moles silicon ($H_2O/Si$) is termed R, where R is a measure of the degree of polymer branching.

SUMMARY OF THE INVENTION

The present siloxane star-graft polymer coatings are formed by reacting specific monomers in solution to form a siloxane-based polymer. The coating encapsulates the nanoparticle.

A coated ceramic powder comprises a plurality of ceramic particles and a siloxane star-graft coating polymer encapsulating at least a portion of the particles. The coating polymer comprises:

$$Si(w,x,y,z)$$

where w, x, y and z are the mole percent tetrafunctional, trifunctional, difunctional and monofunctional monomeric units, respectively, and wherein w is about 20–100 and x, y and z are about 0–30, 0–50 and 0–10, respectively, and at least one of x, y and z is greater than zero.

In the preferred coated ceramic powder, the ceramic is $TiO_2$, $Al_2O_3$, ZnO, iron oxide or $SiO_2$. The iron oxide is $\gamma$-$Fe_2O_3$, $\alpha$-$Fe_2O_3$ or $Fe_3O_4$.

Where the ceramic is $TiO_2$, the coated ceramic powder preferably further comprises $Al^{+3}$ centers to introduce surface defects into the $TiO_2$ powder, thereby rendering the coated $TiO_2$ powder non-photoactive.

In the preferred coated powder:

w is tetraethylorthosilicate;

x is selected from the group consisting of $\gamma$-glycidoxypropyltrimethoxysilane, n-hexyltrimethoxysilane, isobutyltrimethoxysilane, $\gamma$-methacryloxypropyltrimethoxysilane, n-octadecyltrimethoxysilane, and n-propyltrimethoxysilane;

y is selected from the group consisting of dicyclohexyldimethoxysilane, diethyldiethoxysilane, dimethyldichlorosilane, dimethyldiethoxysilane, dimethyldimethoxysilane, diphenyldiethoxysilane, diphenyldimethoxysilane, di-n-hexyldichlorosilane, n-hexylmethyldichlorosilane, methyldodecyldiethoxysilane, neophylmethyldimethoxysilane, and n-octylmethyldimethoxysilane; and z is selected from the group consisting of n-octadecyldimethylmethoxysilane, triethylsilanol, trimethylethoxysilane, and trimethylmethoxysilane.

A method of preparing the above coated ceramic powder comprises the steps of:

(a) polymerizing a tetrafunctional siloxane monomer and at least one of a trifunctional siloxane monomer, a difunctional siloxane monomer and a monofunctional siloxane monomer;

(b) adding a quantity of ceramic powder to a purged reaction vessel;

(c) shear mixing the ceramic powder for a time sufficient to wet substantially all of the powder surface;

(d) adding the siloxane polymer prepared in step (a) to the reaction vessel containing the shear mixed ceramic powder;

(e) shear mixing the shear mixed ceramic powder and the siloxane polymer for a time sufficient to form a siloxane polymer coated ceramic powder;

(f) separating the coated ceramic powder from the components remaining in the reaction vessel.

In the preferred method, the ceramic is $TiO_2$, $Al_2O_3$, ZnO, $Fe_2O_3$ or $SiO_2$.

Where the ceramic is $TiO_2$, a further quantity of aluminum tri-sec-butoxide is optionally added to the reaction vessel in step (b) to introduce surface defects into the $TiO_2$ powder, thereby rendering the coated $TiO_2$ powder non-photoactive.

In the preferred method:

the tetrafunctional siloxane monomer is tetraethylorthosilicate;

the trifunctional siloxane monomer is selected from the group consisting of γ-glycidoxypropyltrimethoxysilane, n-hexyltrimethoxysilane, isobutyltrimethoxy silane, γ-methacryloxypropyltrimethoxysilane, n-octadecyltrimethoxysilane, and n-propyltrimethoxysilane;

the difunctional siloxane monomer is selected from the group consisting of dicyclohexyldimethoxysilane, diethyldiethoxysilane, dimethyldichlorosilane, dimethyldiethoxysilane, dimethyldimethoxysilane, diphenyldiethoxysilane, diphenyldimethoxysilane, di-n-hexyldichlorosilane, n-hexylmethyldichlorosilane, methyldodecyldiethoxysilane, neophylmethyldimethoxysilane, and n-octylmethyldimethoxysilane; and the monofunctional siloxane monomer is selected from the group consisting of n-octadecyldimethylmethoxysilane, triethylsilanol, trimethylethoxysilane, and trimethyl-methoxysilane.

A siloxane star-graft polymer for coating and encapsulating ceramic particles comprises:

Si(w,x,y,z)

where w, x, y and z are the mole percent tetrafunctional, trifunctional, difunctional and monofunctional monomeric units, respectively, and wherein w is at about 20–100 and x, y and z are about 0–30, 0–50 and 0–10, and at least one of x, y and z is greater than zero.

In the preferred star-graft coating polymer:

w is tetraethylorthosilicate;

x is selected from the group consisting of γ-glycidoxypropyltrimethoxysilane, n-hexyltrimethoxysilane, isobutyltrimethoxysilane, γ-methacryloxypropyltrimethoxysilane, n-octadecyltrimethoxysilane, and n-propyltrimethoxysilane;

y is selected from the group consisting of dicyclohexyldimethoxysilane, diethyldiethoxysilane, dimethyldichlorosilane, dimethyldiethoxysilane, dimethyldimethoxysilane, diphenyldiethoxysilane, diphenyldimethoxysilane, di-n-hexyldichlorosilane, n-hexylmethyldichlorosilane, methyldodecyldiethoxysilane, neophylmethyldimethoxysilane, and n-octylmethyldimethoxysilane; and z is selected from the group consisting of n-octadecyldimethylmethoxysilane, triethylsilanol, trimethylethoxysilane, and trimethylmethoxysilane.

DETAILED DESCRIPTION OF THE PREFERRED EMBODIMENTS

Figure 1:
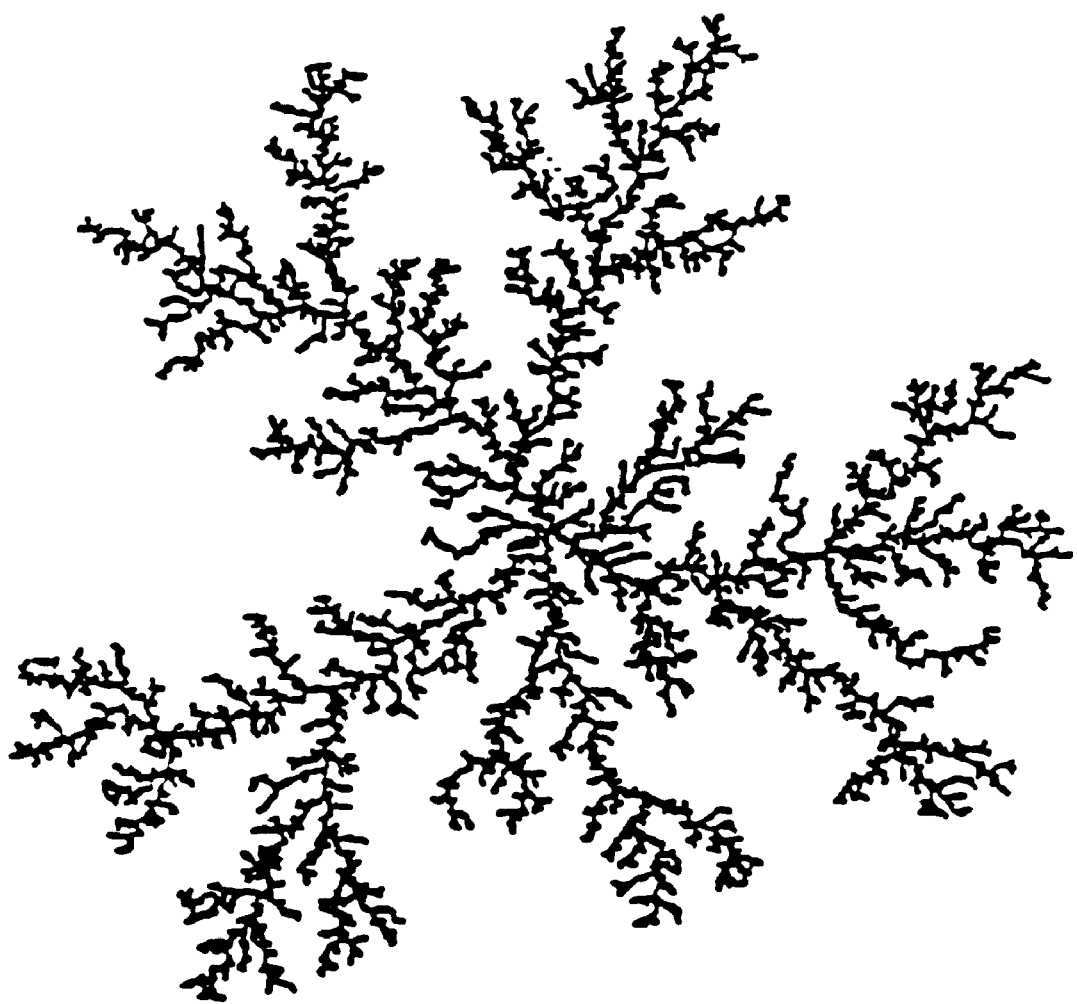
FIG. 1 is a schematic diagram of a fractal, silicon-based polymer, the structure of which is shown in two-dimensions.

The values of w, x, y and z in the above silicon-based polymers have ranged from 20–100, 0–30, 0–50 and 0–10, respectively. Various combinations are employed to control the fractal nature of the siloxane backbone and its chemical nature, that is, the degree of thermodynamic compatibility with a specific diluent of the coating molecule. The chemical identity of the groups may also be varied extensively. Similarly, R has been varied from 1 to 6, and the acid character of the reaction medium has been varied widely. Examples of monomers that may be incorporated in the coating are included, but not limited to, those set forth in Table 1

TABLE I

Coating Monomers

| Monomer | Functionality | Boiling Point |
|---|---|---|
| Dicyclohexyldimethyoxysilane | 2 | 104° C./0.7 mm |
| Diethyldiethoxysilane | 2 | 157° C. |
| Dimethyldichlorosilane | 2 | 70° C. |
| Dimethyldiethoxysilane | 2 | 114° C. |
| Dimethyldimethoxysilane | 2 | 82° C. |
| Diphenyldiethoxysilane | 2 | 167°/15 mm |
| Diphenyldimethoxysilane | 2 | 161.15° C. |
| Di-n-hexyldichlorosilane | 2 | 111° C. |
| γ-Glycidoxypropyltrimethoxysilane | 3 | |
| n-Hexylmethyldichlorosilane | 2 | 204° C. |
| n-Hexyltrimethoxysilane | 3 | 202° C. |
| Isobutyltrimethoxysilane | 3 | 154° C. |
| γ-Methacryloxypropyltrimethoxysilane | 3 | |
| Methyldodecyldiethoxysilane | 2 | 140° C. |
| Neophylmethyldimethoxysilane | 2 | 68° C. |
| n-Octadecyltrimethoxysilane | 3 | 150° C. |
| n-Octadecyldimethylmethoxysilane | 1 | 184° C. |
| n-Octylmethyldimethoxysilane | 2 | 107° C. |
| n-Propyltrimethoxysilane | 3 | 142° C. |
| Tetraethylorthosilicate | 4 | 169° C. |
| Triethylsilanol | 1 | 75° C./24 mm |
| Trimethylethoxysilane | 1 | 75° C. |
| Trimethylmethoxysilane | 1 | 57° C. |

A. General Procedure For Preparing Coating Polymer

The following is a general procedure for preparing a coating polymer designated Si(70, 13.275, 10, 5) and R=1.12:

(1) Add the following chemicals to a reaction vessel that has been purged with dry nitrogen and stir:

(a) 61 ml of anhydrous ethanol (Aldrich #27764.9 or equivalent);

(b) 43.04 ml of tetraethylorthosilicate (TEOS FW 208.33, Aldrich #33385-9 or equivalent);

(c) 15.45 ml of n-octyldecyltrimethyloxysilane (n-ODTMS FW 374.68, Petrach #09780 or equivalent (d) 3.84 ml of diphenyldimethoxysilane (DPDMS FW 244.36, Petrach #D6010 or equivalent);

(e) 2.15 ml of trimethylethoxysilane (TMES FW 118.25, Petrach #T2970 or equivalent);

(f) 3.67 ml of deionized water;
(g) 2.0 ml of 0.1 N hydrochloric acid (VWR Catalog No. VW3200-1or equivalent).
(2) Heat the mixture at 60° C. for 1.5 hours.
(3) Store the prepared sol at 5C.

B. Batch Process For Coated Ceramic Polymers

The following is a process description for preparing coated ceramic powders in 10 gallon batches, optimized with high shear mixing:

(1) Preparation of the coating polymer:
   (a) Purge a 10 liter reaction vessel with dry nitrogen and stir.
   (b) Add:
      1527 ml of anhydrous ethanol;
      1039 ml of tetraethylorthosilicate;
      387 ml of n-octyldecyltrimethoxy silane;
      156 ml of diphenyldimethoxysilane;
      81 ml of trimethylethoxysilane
      93 ml of deionized water;
      50 ml of 0.1 N hydrochloric acid.
   (c) Heat at 60° C. for 1.5 hours.
   (d) Store at 5° C.

The product prepared by the above batch process contains approximately 15 weight percent (wt %) coating polymer.

(2) Preparation of the coated $TiO_2$ polymer:
   (a) Wet powder; add Al-undercoat:
      Purge a 50 liter passivated vessel with argon and stir.
      Add 20 liters of suitable reaction solvent (such as, for example, anhydrous ethanol, ethanol and/or isopropanol)+5 kg $TiO_2$ powder.
      Mix 555 ml of suitable reaction solvent (such as, for example, anhydrous ethanol, ethanol and/or isopropanol), aluminum tri-sec-butoxide ("ASTB")+approximately 500 ml isopropanol.
      Add ASTB solution in a small stream via cannula by argon pressure displacement. The addition of ASTB introduces $Al^{+3}$ centered surface defects into the $TiO_2$ powder, thereby rendering the powder nonphotoactive.
   (b) Dilute; coat powder:
      Add 4 liters of reaction solvent.
      High-shear mix at 7000 rpm for 30 minutes. Temperature increases as the coating reaction proceeds; large-scale reactions may need to be cooled if the temperature increase exceeds 50° C.
      Add 3333 ml of the 15 wt % coating polymer.
      High-shear mix at 7000 rpm for 30 minutes.
   (c) Separate and purify:
      Add 6 liter of deionized water.
      High-shear mix at 7000 rpm for 20 minutes.
      Collect by centrifugation.
   (d) optionally, wash by repeating procedure (c).
   (e) Optionally, dry the wet cake.

(3) Preparation of the dispersion:
   Add dry powder or wet cake to an organic carrier fluid such as, for example, Finsolv.
   Remove reaction solvents if necessary.
   Mix thoroughly.

C. Specific Coating Examples (1) Sunscreens—Si(67.5, 13.275, 10, 7.5)/tetraethylorthosilicate, n-octadecyltrimethoxysilane, diphenyldimethoxysilane, trimethylethoxysilane; R=1.12, Δ60° C. 1.5 hr.

(2) Water soluble—Si(70, 20, 5, 5)/tetraethylorthosilicate, γ-glycidoxypropyltrimethoxysilane, diphenyldimethoxysilane, trimethylethoxysilane; R=1.12, A60° C. 1.5 hr., react pendant epoxy functional group with one of the following: an amino acid such as, for example, β-alanine; a diamine such as, for example, ethylene diamine; or other suitable functionality, such as, for example, sodium sulfite or an anionic-, cationic-, or zwitterionic-functional character.

(3) Acrylate polymers—Si(60, 20, 15, 5)/tetraethylorthosilicate, γ-methacryloxypropyltrimethoxysilane, diphenyldimethoxysilane, trimethylethoxysilane; R=1.12, Δ60° C. 1.5 hr.

(4) Epoxy polymers—Si60, 20, 15, 5)/tetraethylorthosilicate, γ-glycidoxypropyltrimethoxysilane, diphenyldimethoxysilane, trimethylethoxysilane; R=1.12, Δ60° C. 1.5 hr.

(5) Hydrophobic oils—Si(45, 13.275, 34.275, 7.5)/tetraethylorthosilicate, n-octadecyltrimethoxysilane, diphenyldimethoxysilane, trimethylethoxysilane; R=1.12, Δ60° C. 1.5 hr.; or Si(45, 6.64, 40.91, 7.5)/tetraethylorthosilicate, n-octadecyltrimethoxysilane, diphenyldimethoxysilane, trimethylethoxysilane; R=1.12, Δ60° C. 1.5 hr.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A coated ceramic powder comprising a plurality of ceramic particles and a siloxane star-graft coating polymer encapsulating at least a portion of said particles, said coating polymer comprising:

$$Si(w,x,y,z)$$

where w, x, v and z are the mole percent tetrafunctional, trifunctional, difunctional and monofunctional monomeric units, respectively, and wherein w is about 20–100 and x, v and z are about 0–30, 0–50 and 0–10, respectively, and at least one of x, y and z is greater than zero, wherein:

w is tetraethylorthosilicate;

x is selected from the group consisting of γ-glycidoxypropyltrimethoxysilane, n-hexyltrimethoxysilane, isobutyltrimethoxysilane, γ-methacryloxypropyltrimethoxysilane, n-octadecyltrimethoxysilane, and n-propyltrimethoxysilane;

y is selected from the group consisting of dicyclohexyldimethoxysilane, diethyldiethoxysilane, dimethyldichlorosilane, dimethyldiethoxysilane, dimethyldimethoxysilane, diphenyldiethoxysilane, diphenyldimethoxysilane, di-n-hexyldichlorosilane, n-hexylmethyldichlorosilane, methyldodecyldiethoxysilane, neophylmethyldimethoxysilane, and n-octylmethyldimethoxysilane; and z is selected from the group consisting of n-octadecyldimethylmethoxysilane, triethylsilanol, trimethylethoxysilane, and trimethylmethoxysilane.

* * * * *